United States Patent [19]

Shirai et al.

[11] Patent Number: 5,008,327
[45] Date of Patent: Apr. 16, 1991

[54] ELECTRODEPOSITION COATING COMPOSITION

[75] Inventors: Shinji Shirai, Yugawara; Hiroyuki Negishi, Hiratsuka; Nobuyuki Tomihashi, Takatsuki; Masayuki Yamane, Osaka, all of Japan

[73] Assignees: Kansai Paint Co., Ltd., Hyogo; Daikin Industries, Ltd., Osaka, both of Japan

[21] Appl. No.: 564,674

[22] Filed: Aug. 8, 1990

Related U.S. Application Data

[63] Continuation of Ser. No. 330,029, Mar. 29, 1989, abandoned.

[30] Foreign Application Priority Data

Mar. 30, 1988 [JP] Japan .................... 63-78352

[51] Int. Cl.$^5$ .................... C09D 5/00; C08K 27/12
[52] U.S. Cl. .................... 524/544; 524/901; 524/546
[58] Field of Search .................... 524/544, 546, 901

[56] References Cited

U.S. PATENT DOCUMENTS

| | | | |
|---|---|---|---|
| 4,667,000 | 5/1987 | Ohmor et al. | 526/249 |
| 4,690,968 | 9/1987 | Mitani et al. | 524/544 |
| 4,711,926 | 12/1987 | Kojima et al. | 524/901 |

FOREIGN PATENT DOCUMENTS

| | | | |
|---|---|---|---|
| 0224870 | 6/1987 | European Pat. Off. | |
| 61-231044 | 10/1986 | Japan | 524/546 |
| 2-055776 | 1/1990 | Japan | 524/901 |

*Primary Examiner*—Joseph L. Schofer
*Assistant Examiner*—Mark Sweet
*Attorney, Agent, or Firm*—Armstrong, Nikaido Marmelstein Kubovcik & Murray

[57] ABSTRACT

An electrodeposition coating composition comprising a fluorine-containing copolymer, a curing agent and an aqueous medium, said composition having a fluorine ion content of not more than 15 ppm.

According to the composition of the present invention, since a bad influence to electrodeposition due to fluorine ion can be remarkably inhibited, the excellent electrodeposited film can be obtained therefrom.

7 Claims, No Drawings

ELECTRODEPOSITION COATING COMPOSITION

This application is a continuation of application Ser. No. 330,029 filed Mar. 29, 1989, now abandoned.

BACKGROUND OF THE INVENTION

The present invention relates to an electrodeposition coating composition containing a fluorine-containing polymer.

It has been known that electrodeposition coating compositions containing a fluorine-containing polymer can give films which are more excellent in chemical resistance, weatherability, and the like compared to known electrodeposition coating compositions containing an acrylic resin, as disclosed in, for instance, Japanese Unexamined Patent Publication No. 59676/1987 and No. 127362/1987, and the like.

However, when conducting electrodeposition using the composition containing the fluorine-containing polymer, there occur problems that a metal as an anode is eluted, the stability of the electrodeposition coating composition is lowered, and the like.

An object of the present invention is to provide an electrodeposition coating composition containing a fluorine-containing copolymer which can solve the above-mentioned defects and can give electrodeposited films having excellent properties.

This and other objects of the present invention will become apparent from the description hereinafter.

SUMMARY OF THE INVENTION

It has now been found that fluorine ion produced during preparation of a fluorine-containing copolymer exerts a very bad influence on electrodeposition of a composition containing a fluorine-containing copolymer, and the above-mentioned defects can be solved by decreasing a content of fluorine ions existing in the electrodeposition coating composition to not more than a specific value.

In accordance with the present invention, there is provided an electrodeposition coating composition comprising a fluorine-containing copolymer, a curing agent and an aqueous medium; the composition having a fluorine ion content of not more than 15 ppm.

DETAILED DESCRIPTION

According the to present inventors' research, as the negative influence of fluorine ion existing in the electrodeposition coating composition containing fluorine-containing copolymer on electrodeposition, there are cited the following respects:

(1) Elution of a metal used as an anode

In case of electrodeposition of the anionic electrodeposition coating composition wherein an article to be electrodeposited with the composition is used as an anode, fluorine ion exerts bad influence on electrodeposition, particulary, when an article to be electrodeposited is aluminum, since the aluminum article surface is usually covered with aluminium oxide layer (Almite layer) there occurs during electrodeposition the following reaction:

$$Al_2O_3 + 6HF \rightarrow 2AlF_3 + 3H_2O + 112 \text{ kcal/mol}$$

So, the aluminum oxide layer is destroyed, resulting in fatal defects.

(2) Lowering of stability of electrodeposition coating composition

The water-solubility or water-dispersibility of the fluorine-containing copolymer is impared by salting-out due to fluorine ion to lower the storage stability.

(3) Inclease of specific conductivity

Coulombic yield is lowered with increase of the specific conductivity, and further, film defects are caused by a high voltage for electrodeposition.

Although other halogen ions than fluorine ion also exert the above-mentioned bad influences, fluorine ion exerts the worst influences.

For instance, a rate of destroy of the aluminum oxide layer of the aluminum anode due to fluorine ion is faster than that of the aluminum oxide layer due to chlorine ion. That is, chlorine ion acts on electrodeposition as follow:

$$Al_2O_3 + 6HCl \rightarrow 2AlCl_3 + 3H_2O + 97 \text{ kcal/mole}$$

Therefore, the case of fluorine ion is higher in calorific value than the case of chlorine ion, as shown above, the calorific value of fluorine ion being 112 kcal/mole. So the destroy rate of the aluminum oxide layer due to fluorine ion is faster than that of the aluminum oxide layer due to chlorine ion.

Also, the oxidation rates of fluorine ion and chlorine ion are as follows:

$$2F^\ominus = F_2 + 2e^\ominus - 2.8500 \text{ V } (E_1^h)$$

$$2Cl^\ominus = Cl_2 + 2e^\ominus - 1.3580 \text{ V } (E_1^h)$$

As shown above, fluorine ion is extremely faster in oxidation rate ($E_1^h$) than chlorine ion.

Accordingly, the properties of the electrodeposition coating composition are influenced by all of halogens, particularly are most influenced by fluorine ion.

In the present invention, a fluorine ion content of the electrodeposition coating composition is adjusted to not more than 15 ppm, preferably not more than 10 ppm. In case of using a copolymer containing halogen ions in addition to fluorine ion, particularly, using a fluorine and chlorine-containing copolymer, a total content of fluorine ion and chlorine ion in the composition is adjusted to not more than 30 ppm, preferably not more than 20 ppm.

In the present invention, as the fluorine-containing polymer, there are exemplified copolymers of a fluoroolefin having the formula (I):

$$CX^1X^2 = CF^2 \tag{I}$$

wherein $X^1$ and $X^2$ are the same or different and each is a hydrogen atom, a fluorine atom, a chlorine atom or a trifluoromethyl group, and a hydroxy vinyl ether having the formula (II):

$$CH_2 = CH - O - R^1 - OH \tag{II}$$

wherein $R^1$ is a bivalent aliphatic group having 2 to 10 carbon atoms, to which carboxyl groups are introduced; and the like.

As a method for introducing carboxyl groups into the copolymer of the fluoroolefin (I) and the hydroxy vinyl ether (II), there are, for instance, exemplified a method (A) wherein a dibasic acid anhydride having the formula (III):

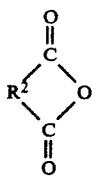
(III)

wherein $R^2$ is a bivalent organic group is reacted with the copolymer of the fluoroolefin (I) and the hydroxy vinyl ether (II); a method (B) wherein the hydroxy vinyl ether (II) is reacted with the acid anhydride (III) to give a vinyl ether having carboxyl group and hydroxyl group, and the obtained vinyl ether, the fluoroolefin (I) and the hydroxyvinyl ether (II) are copolymerized; and the like.

Examples of the fluoroolefin (I) are, for instance, $CF_2=CF_2$, $CF_2=CH_2$, $CF_2=CFCl$, $CF_2=CFCF_3$, and the like. The fluoroolefins (I) are not limited thereto. The fluoroolefin (I) may be used alone or as an admixture thereof.

Examples of the hydroxy vinyl ether (II) are, for instance, hydroxyethyl vinyl ether, hydroxypropyl vinyl ether, hydroxybutyl vinyl ether, hydroxyhexyl vinyl ether, 2-hydroxy-1-methylethyl vinyl ether, and the like. The hydroxyvinyl ethers (II) are not limited thereto. The ethers (II) may be used alone or as an admixture thereof.

Examples of the dibasic acid anhydride (III) are, for instance, maleic anhydride, succinic anhydride, methylsuccinic anhydride, adipic anhydride, glutaric anhydride, glutaconic anhydride, itaconic anhydride, citraconic anhydride, 1,2-cyclohexane dicarboxylic anhydride, 4-methyl-1,2-cyclohexane dicarboxylic anhydride, 1-cyclohexene-1,2-dicarboxylic anhydride, Diels-Alder addition reaction products of cyclopentadiene and maleic anhydride, and the like. The acid anhydrides (III) are not limited thereto. The acid anhydrides (III) may be used alone or as an admixture thereof.

In the method (A) and the method (B), the reaction of hydroxyl group with the acid anhydride (III) is carried out in the presence of a basic compound. Examples of the basic compounds are, for instance, ammonium, a primary, secondary or tertiary amine such as ethyl amine, propyl amine, butyl amine, benzyl amine, diethylamine, dibutylamine, monoethanol amine, triethylamine, tripropylamine, tributylamine, N-dimethylbenzylamine, N-dimethylcyclohexylamine or dimethylethanolamine; a hydroxide or alcoholate of an alkali metal such as lithium hydroxide, sodium hydroxide, potassium hydroxide, sodium carbonate, potassium carbonate, sodium methylate, sodium ethylate or potassium methylate; a pyridine base such as pyridine; zirconium naphthenate, tetrabutyl zirconate, tetrabutyl titanate, tetraoctyl titanate, and the like. The basic compounds are not limited thereto.

The amount of the basic compound is from 0.0001 to 10 moles per mole of the acid anhydride (III). It is preferable that in the method (A), the amount of the basic compound is from 0.0005 to 0.005 mole per mole of the acid anhydride (III), and in the method (B), the amount of the basic compound is from 0.01 to 1.0 mole per mole of the acid anhydride (III).

In the present invention, an alkyl vinyl ether or vinyl ester having the formula (IV):

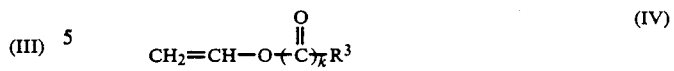
(IV)

wherein $R^3$ is an aliphatic or alicyclic group having 1 to 17 carbon atoms or a fluoralkyl group having 1 to 20 carbon atoms and k is 0 or 1 may be optionally copolymerized with the fluoroolefin (I) and hydroxy vinyl ether (II).

Examples of the alkyl vinyl ether or vinyl ester (IV) are, for instance, an alkyl vinyl ether such as methyl vinyl ether, ethyl vinyl ether, n-propyl vinyl ether, isopropyl vinyl ether, n-butyl vinyl ether, isobutyl vinyl ether, t-butyl vinyl ether, n-pentyl vinyl ether, n-hexyl vinyl ether, n-octyl vinyl ether, 2-ethylhexyl vinyl ether, cyclohexyl vinyl ether, lauryl vinyl ether, stearyl vinyl ether, 2,2,2-trifluoroethyl vinyl ether, 2,2,3,3-tetrafluoropropyl vinyl ether, 2,2,3,3,3-pentafluoropropyl vinyl ether, 2,2,3,3,4,4,5,5-octafluoropentyl vinyl ether or 2,2,3,3,4,4,4-heptafluorobutyl vinyl ether; and a vinyl ester such as vinyl acetate, vinyl propionate, vinyl butyrate, vinyl pivalate, vinyl caproate, vinyl laurate, vinyl Versatate or vinyl cyclohexanecarboxylate.

In the present invention, the fluorine-containing polymer composed of 20 to 80% by mole, more preferably from 40 to 60% by mole, of the units of the fluoroolefin (I), 2 to 60% by mole, more preferably from 5 to 40% by mole, of the units of the hydroxy vinyl ether (II) and 0 to 60% by mole of the units of the alkyl vinyl ether or vinyl ester (IV) is prefered.

The acid value of the fluorine-containing copolymer is preferably from 5 to 150, more preferably from 30 to 120, and the hydroxyl value of the fluorine-containing copolymer is preferably from 30 to 200, more preferably 50 to 150. When the acid value is too small, not only there is a tendency that the specific conductivity is low and the throwing property is poor but also the water-dispersibility becomes poor. On the other hand, when the acid value is too high, the boiling water resistance and chemical resistance of the electrodeposited film are lowered. When the hydroxyl value is too small, the composition tends to cure insufficiently, and on the other hand, when the hydroxyl value is too much, the boiling water resistance and chemical resistance of the film are lowered.

In the present invention, there are preferable fluorine-containing polymers wherein carboxyl groups are partially or completely neutralized. Examples of the neutralizing agent are, for instance, basic compound such as ammonium, the same primary, secondary or tertiary amine, hydroxide or alcoholate of alkali metal or pyridine base as mentioned above, and the like. Among them, ammonium, the primary, secondary and tertiary amines are preferred. The degree of neutralization is from 30 to 100% by mole, preferably from 50 to 100% by mole.

The fluorine-containing copolymers used in the present invention have a number average molecular weight ($\overline{Mn}$) of 2,000 to 120,000, preferably from 10,000 to 100,000. When the number average molecular weight is too small, there is a tendency that the water resistance and the chemical resistance of electrodeposited films are lowered. On the other hand, when the molecular weight is too large, the smoothness of electrodeposited films are lowered.

Such fluorine-containing copolymers are excellent in water-dispersibility and electrophoresis.

During preparation of the fluorine-containing copolymer, fluorine ion is generated from the fluoroolefin (I). The amount of fluorine ion varies depending on polymerization conditions, polymerization forms, and the like. Usually, the amount of fluorine ion generated is not less than 200 ppm of the fluorine-containing polymer. When the fluorine-containing copolymer is prepared, using a fluorine and chlorine-containing compound such as chlorotrifluoroethylene as the fluoroolefin (I), chlorine ion is also generated with fluorine ion, the total amount of chlorine ion and fluorine ion being usually not less than 500 ppm.

In the present invention, the generated fluorine ion and chlorine ion during preparation of the fluoine-containing copolymer are removed from the copolymer to adjust the content of fluorine ion in the fluorine-containing copolymer to not more than 150 ppm of the copolymer, or when remaining chlorine ion with fluorine ion, to adjust the total content of fluorine ion and chlorine ion to not more than 300 ppm of the copolymer. Such a fluorine-containing copolymer is used as one component of the electrodeposition coating composition.

When fluorine ion and chlorine ion are removed from the fluorine-containing copolymer, the polymerization reaction product can be subjected to dehalogenation treatment as it is, the electrodeposition coating composition obtained from the fluorine-containing copolymer can be subjected to dehalogenation, and a dilute solution of the fluorine-containing polymer can be subjected to dehalogenation.

As the dehalogenation method, there are, for instace, a method using an ion-exchange resin, a method contacting the substance to be dehalogenated with a dehalogenating agent, and the like. The method using the ion-exchange resin is hard to apply to the polymerization reaction product having a high viscosity, also in case of applying the method to the electrodepostion coating composition, hydroxy ion becomes an obstacle of ion-exchange because the pH of the composition is maintained at pH 8 to 9, so the method must be carefully applied to the composition.

The method using the dehalogenating agent can be widely applied compared to the method using the ion-exchange resin, so the method using the dehalogenating agent is preferable. When contacting the dilute solution of the composition containing the fluorine-containing copolymer with the dehalogenating agent, any methods such as a method in which a column is filled with the dehalogenating agent and the dilute solution is contacted with the dehalogenating agent, a method in which the dilute solution and the dehalogenating agent are stirred and filtered off, and the like.

As the dehalogenating agent, there can be effectively used an oxide, a hydroxide or a carbonate of an alkaline earth metal, silicon or aluminum, for instance, CaO, MgO, $CaCO_3$, $Al_2O_3$, $SiO_2$, and the like. The dehalogenation is conducted at a temperature of 0° to 100° C., preferably from 20° to 80° C. for usually from 10 minutes to 48 hours, preferably from 1 to 5 hours. The amount of the dehalogenating agent is from 0.5 to 20% by weight of the fluorine-containing copolymer.

The concentration of the fluorine-containing polymer in the dilute solution is about 0.1 to 70% by weight. Examples of the diluent are, for instace, carbital (diethylene glycol monomethyl ether or diethylene glycol monoethyl ether) diluents, cellosolve (ethylene glycol monomethyl ether or ethylene glycol monoethyl ether) diluents, glyme (ethylene glycol dimethyl ether or ethylene glycol diethyl ether) diluents, alcohol (methanol, ethanol, propanol or butanol) diluents, ketone (acetone, diacetone alcohols or dioxane) diluents, amide (dimethylformamide or dimethylacetoamide) diluents, glycol (ethylene glycol or propylene glycol) diluents, and the like.

The electrodeposition coating composition are generally composed of the fluorine-containing copolymer, a curing agent and an aqueous medium.

The curing agent incorporated in the electrodeposition coating composition of the present invention is a curing agent capable of reacting with hydroxyl group and/or carboxyl group included in the copolymer to crosslink the copolymer. Examples of the curing agent are, for instance, a blocked isocyanate such as a blocked hexamethylene diisocyanate trimer, an amino resin, and the like. The amino resin includes a melamine resin such as methylated melamine, methylolmelamine or butylolmelamine, benzoguanamine resin, a urea resin such a methylated urea or butylated urea, and the like. Among them, alkoxymethylated melamine resins of methyl ether type and of mixed $C_4$ to $C_1$ alkyl ether type are preferable.

The curing agent is used usually in an amount of 0.2 to 4 equivalents, preferably from 0.5 to 2.5 equivalents, based on the total of hydroxy group and carboxyl group present in the copolymer. When the amount of the curing agent is too much, the weatherability of the obtained films lowers, and on the other hand, when the amount is too small, the hardness of the films lowers.

As the aqueous medium, a mixed solvent of not less than 50% by weight of water and a solvent. Examples of the solvents are, for instace, carbital (diethylene glycol monomethyl ether or diethylene glycol monoethyl ether) diluents, cellosolve (ethylene glycol monomethyl ether or ethylene glycol monoethyl ether) diluents, glyme (ethylene glycol dimethyl ether or ethylene glycol diethyl ether) diluents, alcohol (methanol, ethanol, propanol or butanol) diluents, ketone (acetone, diacetone alcohols or dioxane) diluents, amide (dimethylformamide or dimethylacetoamide) diluents, glycol (ethylene glycol or propylene glycol) diluents, and the like.

In the electrodeposition, the weight ratio of the aqueous medium to the fluorine-containing copolymer to be placed in an electrolyte bath is from 70 to 99: 1 to 30, preferably 80 to 97: 3 to 20. When the amount of the copolymer is less than the above range, the electrodeposition voltage increases too high, and when the amount is more than the above range, the electrodeposition loss increases.

The composition may include other additives such as a pigment and a dye.

Usual electrodeposition method is applicable to the composition of the present invention. In the electrodeposition using the composition of the invention, the bath temperature is usually from 10° to 40° C., preferably from 15° to 35° C., the electrodeposition voltage is usually from 50 to 500 V, preferably from 100 to 300 V (a substrate to be electrodeposited: anode), the distance between electrodes is usually from 1 to 100 cm, preferably from 10 to 50 cm, and the electrodeposition time is usually from 0.5 to 10 minutes, preferably from 1 to 5 minutes.

After the completion of the electrodeposition, the electrodeposited article is washed with water if necessary, and then is heated at a temperature of 150° to 200° C. for 5 to 60 minutes to cure the coating. When the substrate used can stand a high temperature, the coated article may be heated to about 300° C.

The thickness of the coating films is ususally from 2 to 50 μm, preferably from 5 to 13 μm. When the film thickness is too thick, the cost is expensive, the smoothness is poor and bubbles are easily formed on the film, which results in generation of film defects. On the other hand, when the film thickness is too thin, it is easy to produce pin holes and blisters.

The substrates used in the electrodeposition process of the invention are not limited so long as they are electrically conductive. When aluminum or an aluminum alloy is used as the substrate, the obtained film is excellent in the weatherability, the stain resistance and the corrosion resistance, and is uniform and smooth.

The present invention is more specifically described and explained by means of the following Examples in which all % and parts are by weight unless otherwise noted. It is to be understood that the present invention is not limited to the Examples.

The following Reference Examples are presented to illustrate the preparation of fluorine-containing copolymers used in the present invention.

REFERENCE EXAMPLE 1

Preparation of fluorine-containing copolymer

A 800 ml glass autoclave with a stirrer was charged with 160 g of ethylene glycol dimethyl ether (monoglyme), 128.2 g (1.10 moles) of chlorotrifluoroethylene (hereinafter referred to as "CTFE"), 49.9 g (0.43 mole) of hydroxybutyl vinyl ether (hereinafter referred to as "HBVE"), 61.4 g (0.31 mole) of a vinyl ester of carboxylic acid having an alkyl group with 10 carbon atoms [commercially available from Shell Kagaku Kabushiki Kaisha under a trade name "Veova 10" (hereinafter referred to as "Va")], 70.2 g (0.26 mole) of a compound:

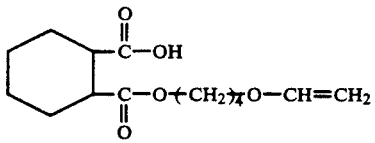

(hereinafter referred to as "CHHEM"), 2.63 g (0.026 mole) of triethylamine and 1.64 g of azobisisobutyronitrile (hereinafter referred to as "AIBN"), and the mixture was polymerized at 65° C. for 20 hours with stirring to give a reaction product of a fluorine-containing copolymer. Each of the charged monomers was previously solidified and degassed with liquid nitrogen, and air in the autoclave was previously replaced with nitrogen gas. Amount of the reaction product: 451 g Concentration of the fluorine-containing copolymer in the reaction product: 64.3%

As to the fluorine-containing copolymer, the acid value and the hydroxyl value were measured according to JIS K 0070, the number average molecular weightd (Mn) was measured by gel permeation chromatography (GPC) and the fluorine ion content and chlorine ion contentd were measured.

Acid value: 49 KOH mg/g
Hydroxyl value: 81 KOH mg/g
Mn: 70,000
Fluorine ion content: 293 ppm
Chlorine ion content: 351 ppm

Measurement of halogen ion content

In 100 g of methyl isobutyl ketone is dissolved 1.0 g of the obtained fluorine-containing copolymer, to which 100 g of deionized water is added and the mixture was thoroughly stirred in a 300 ml separatory funnel to separate an aqueous layer. The concentration of fluorine ion or chlorine ion in the aqueous layer was measured by ion chromatography. The values of the halogen contents as mentioned above or shown in Table 1 are based on the fluorine-containing copolymer.

REFERENCE EXAMPLES 2 to 5

Preparation of fluorine-containing copolymer

The procedure of Reference Example 1 was repeated except that compounds shown in Table 1 were used to give a fluorine-containing copolymer. The properties of the copolymer are shown in Table 1.

REFERENCE EXAMPLE 6

Preparation of fluorine-containing copolymer

A 800 ml glass antoclave with a stirrer was charged with 160 g of ethylene glycol dimethyl ether, 128.2 g (1.10 moles) of CTFE, 73.1 g (0.63 mole) of HBVE, 73.3 g (0.37 mole) of Va, 2.63 g (0.026 mole) of triethyl amine and 1.64 g of AIBN, and the mixture was polymerized under the same reaction conditions as in Reference Example 1. After completing the polymerization, 32.3 g (0.21 mole) of 1,2-cyclohexyl dicarboxylic acid anhydride was added to the polymerization mixture and the reaction was continued at 80° C. for 10 hours.

The properties of the obtained fluorine-containing copolymer are shown in Table 1.

In Table 1, EVE is ethyl vinyl ether, succinic HEM is a compound:

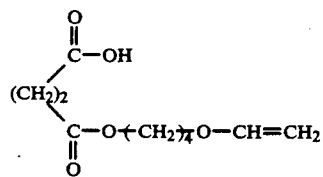

and TFE is tetrafluoroethylene.

TABLE 1

| Ref. Ex. No. | 1 | 2 | 3 | 4 | 5 | 6 |
| --- | --- | --- | --- | --- | --- | --- |
| Component (g) | | | | | | |
| CTFE | 128.2 | 128.2 | 128.2 | 128.2 | — | 128.2 |
| TFE | — | — | — | — | 120.0 | — |
| HBVE | 49.9 | 49.9 | 49.9 | 49.9 | 49.9 | 73.1 |
| Va | 61.4 | 61.4 | 61.4 | 25.7 | 61.4 | 73.3 |
| EVE | — | — | — | 13.0 | — | — |
| CHHEM | 70.2 | 70.2 | 70.2 | — | 70.2 | — |

TABLE 1-continued

| Ref. Ex. No. | 1 | 2 | 3 | 4 | 5 | 6 |
|---|---|---|---|---|---|---|
| Succinic HEM | — | — | — | 56.2 | — | — |
| Triethyl amine | 2.63 | 7.88 | 1.78 | 2.63 | 2.63 | 2.63 |
| AIBN | 1.64 | 1.64 | 1.64 | 1.64 | 2.00 | 1.64 |
| 1,2-Cyclohexane dicarboxylic acid anhydride | — | — | — | — | — | 32.3 |
| Property | | | | | | |
| Acid value | 49 | 49 | 49 | 56 | 48 | 40 |
| Hydroxyl value | 81 | 81 | 81 | 92 | 80 | 80 |
| Fluorine ion content (ppm) | 293 | 462 | 185 | 211 | 253 | 232 |
| Chlorine ion content (ppm) | 351 | 712 | 318 | 325 | — | 476 |
| Mn | 70,000 | 50,000 | 72,000 | 40,000 | 53,000 | 65,000 |

REFERENCE EXAMPLE 7

Dehagogenation of fluorine-containing copolymer

The fluorine-containing copolymer obtained in Reference Example 1 was diluted with isopropyl alcohol (IPA) to adjust a concentration of the copolymer to 25%. The thus obtained varnish containing the fluorine-containing copolymer was added to a flask with a stirrer in an amount of 10 g, to which 10 g of MgO was added and the mixture was stirred at 60° C. for 24 hours, then was filtered off through a glass filter. The obtained filtrate was extracted with deionized water. As to the obtained aqueous layer, a fluorine ion content and a chlorine ion content were measured in the same manner as in Reference Example 1. The fluorine ion content was 15 ppm per the fluorine-containing copolymer and the chlorine ion content was 56 ppm per the copolymer.

REFERENCE EXAMPLE 8 TO 16

Dehalogenation of fluorine-containing copolymer

A fluorine-containing copolymer shown in Table 2 was dehalogenated in the same manner as in Reference Example 7 except that dehalogenation conditions shown in Table 2 were adopted. The fluorine ion content and chlorine ion content were measured in the same manner as in Reference Example 1. The results are shown in Table 2.

REFERENCE EXAMPLE 17

The fluorine-containing copolymer obtained in Reference Example 1 was diluted with IPA to give a varnish having a concentration of the copolymer of 25%. To a column (inside diameter: 3 cm, height: 20 cm) provided a jacket and a glass filter in the bottom portion, in which 50 g of MgO was filled, was added 100 g of the obtained varnish containing the fluorine-containing copolymer, and the varnish was dehalogenated at 60° C. for 24 hours under nitrogen pressure (1.0 kg/cm$^2$G). Then the fluorine ion content and chlorine ion content were measured in the same manner as in Reference Example 1. The fluorine ion content and chlorine ion content are shown in Table 2.

TABLE 2

| Ref. Ex. No. | 7 | 8 | 9 | 10 | 11 |
|---|---|---|---|---|---|
| Fluorine-containing copolymer | Copolymer in Ref. Ex. 1 | Copolymer in Ref. Ex. 1 | Copolymer in Ref. Ex. 1 | Copolymer in Ref. Ex. 1 | Copolymer in Ref. Ex. 1 |
| Dehalogenating agent | MgO | MgO | Silica gel | CaO | Alumina (Aluminum oxide) |
| (Amount, g) | (10.0) | (25.0) | (10.0) | (10.0) | (10.0) |
| Copolymer concentration in varnish (%) | 25 | 50 | 25 | 25 | 25 |
| Diluent | IPA | IPA | IPA | IPA | IPA |
| Amount of varnish (g) | 100 | 100 | 100 | 100 | 100 |
| Dehalogenation time (hour) | 24 | 24 | 10 | 24 | 24 |
| Dehalogenation temperature (°C.) | 60 | 30 | 60 | 60 | 60 |
| Fluorine ion content (ppm/copolymer) | | | | | |
| Before dehalogenation | 293 | 293 | 293 | 293 | 293 |
| After dehalogenation | 15 | 21 | 25 | 28 | 31 |
| Chlorine ion content (ppm/copolymer) | | | | | |
| Before dehalogenation | 351 | 351 | 351 | 351 | 351 |
| After dehalogenation | 56 | 58 | 117 | 85 | 97 |
| Total content of fluorine ion and chlorine ion (ppm/copolymer) | | | | | |
| Before dehalogenation | 644 | 644 | 644 | 644 | 644 |
| After hehalogenation | 71 | 79 | 142 | 113 | 128 |

| Ref. Ex. No. | 12 | 13 | 14 | 15 | 16 | 17 |
|---|---|---|---|---|---|---|
| Fluorine-containing copolymer | Copolymer in Ref. Ex. 2 | Copolymer in Ref. Ex. 3 | Copolymer in Ref. Ex. 4 | Copolymer in Ref. Ex. 5 | Copolymer in Ref. Ex. 6 | Copolymer in Ref. Ex. 1 |
| Dehalogenating agent | MgO | MgO | MgO | MgO | MgO | MgO |
| (Amount, g) | (8.0) | (8.0) | (8.0) | (8.0) | (8.0) | (50) |
| Copolymer concentration in varnish (%) | 25 | 25 | 25 | 25 | 25 | 25 |
| Diluent | IPA | IPA | IPA | IPA | IPA | IPA |
| Amount of varnish (g) | 100 | 100 | 100 | 100 | 100 | 100 |
| Dehalogenation time (hour) | 10 | 24 | 5 | 5 | 6 | 10.0 |
| Dehalogenation temperature (°C.) | 60 | 30 | 60 | 60 | 60 | 60 |
| Fluorine ion content (ppm/copolymer) | | | | | | |
| Before dehalogenation | 462 | 185 | 211 | 253 | 232 | 293 |
| After dehalogenation | 32 | 46 | 28 | 33 | 18 | 33 |
| Chlorine ion content (ppm/copolymer) | | | | | | |
| Before dehalogenation | 712 | 318 | 325 | — | 476 | 351 |

TABLE 2-continued

| | | | | | | |
|---|---|---|---|---|---|---|
| After dehalogenation | 123 | 71 | 63 | — | 91 | 54 |
| Total content of fluorine ion and chlorine ion (ppm/copolymer) | | | | | | |
| Before dehalogenation | 1174 | 503 | 536 | 253 | 708 | 644 |
| After hehalogenation | 155 | 117 | 91 | 33 | 109 | 87 |

EXAMPLE 1

The varnish containing the fluorine-containing copolymer obtained in Reference Example 7 with the copolymer concentration of 25%, which was dehalogenated, was concentrated under reduced pressure to give a varnish with a copolymer concentration of 65%. To 100 parts of the varnish was added 3.9 parts of dimethyl ethanol amine (0.9 equivalent per a copolymer acid value of 49) to partially neutralize. An electrodeposition coating composition was prepared according to the following formulation.

| | Amount (part) |
|---|---|
| Varnish (concentration: 65%) | 100 |
| Butyl Cellosolve (ethylene glycol monobutyl ether) | 10 |
| 80% methyl methylolated melamine resin (commercially available under the trade mark "Melane 620" made by Hitachi Chemical Co., Ltd., solid content: 70%) | 20 |
| Deionized water | 990 |

The obtained composition was placed in an electrocoating bath and was coated onto an alumite-treated aluminum alloy plate as anode (6063S aluminum alloy plate having a 9 $\mu$m thick anodic oxidation coating subjected to sealing) by applying an electric current to the bath at a bath temperature of 20° C. and a voltage of 140 V for 3 minutes. The coated plate was washed with water, and was baked and cured at 180° C. for 30 minutes.

With respect to the thus formed coating film, the thickness, gloss, weatherability, adhesion, boiling water resistance, alkali resistance after boiling water resistance test, acid resistance, throwing property, smoothness, pencil hardness and impact resistance, and as to the composition stability were measured by the following methods.

The results are shown in Table 3.

Film thickness ($\mu$m)

The thickness is measured by using a film thickness meter ("PERMASCOPE EW" made by Kabushiki Kaisha Kett Kagaku Kenkyusho).

Gloss (%)

The 60° C. specular gloss is measured by using a glossmeter ("VG-2PD" made by Nippon Dnshoku Kogyo Kabushiki Kaisha).

Weatherability (%)

The accelerated weathering test is made for 360 hours using a Weather-O-Meter (made by Suga Shikenki Kabushiki Kaisha) under conditions: dew cycle, irradiation/darkness=60 min./60 min.; black panel temperature 63° C. The gloss retention rate (%) is measured.

Adhesion

The coating film is cross-cut by a knife into 100 squares each having a size of 1×1 mm, and a cellophane adhesive tape is repeatedly stuck and peeled off 10 times. The number of remaining squares is counted.

Boiling water resistance

The boiling water resistance is measured according to Japanese Industrial Standard (JIS) H 8602.

Alkali resistance after boiling water resistance test

The film after boiling water resistance test is dipped in a 1% aqueous solution of sodium hydroxide for 72 hours. The appearance of the film is observed with the naked eye as to whether blisters are produced or not.

Acid resistance

The film is dipped in a 5% aqueous solution of hydrochloric acid for 7 days and the appearance of the film is observed with the naked eye.

Throwing property

The thicknesses of the film coated on the front side and reverse side of the aluminum plate are measured by using PERMASCOPE EC, and a difference between the both film thicknesses is calculated.
Good: The difference is less than 2 $\mu$m.
Bad : The difference is 2 $\mu$m or more.

Smoothness

The appearance of the film after baking is observed with the naked eye with respect to the presence of pinholes and unevenness.

Pencil hardness

The pencil hardness is measured according to JIS H 8602.

Impact resistance

A ball (weight: 1 kg, diameter: ½ inch) falls down to the film on the aluminium plate by using a Du pont impact tester. The highest height that the film is not broken is shown in Table 3 (provided that the maximum value is 50 cm).

Stability of the composition

The electrodeposition coating composition is allowed to stand for one month at 30° C. and it is observed with the naked eye.

EXAMPLES 2 TO 11

The procedure of Example 1 was repeated except that the fluorine-containing copolymer shown in Table 3 was used to give a varnish, which was particularly neutralized.

An electrodeposition coating composition was prepared in the same formulation as in Example 1 except that the above varnish was used.

Using the composition, the electrodeposition was conducted in the same manner as in Example 1.

As to the obtained film, the film thickness, gloss, weatherability, adhesion, boiling water resistance, alkali resistance after boiling water resistance test, acid resistance, appearance, throwing property, smoothness, pencil hardness and impact resistance, and as to the composition, the stability were measured in the same manner as in Example 1. The results are shown in Table 3.

COMPARATIVE EXAMPLE 1

The fluorine-containing copolymer obtained in Reference Example 1, which was not dehalogenated, was diluted with IPA to give a varnish having a copolymer content of 65%.

The neutralization was conducted in the same manner as in Example 1.

Using the obtained varnish, an electrodeposition coating composition was prepared in the same formulation as in Example 1.

Then, using the obtained electrodeposition coating composition, electrodeposition was conducted in the same manner as in Example 1.

As to the obtained film, the thickness, gloss, weatherability, adhesion, boiling water resistance, alkali resistance after boiling water resistance test, acid resistance, throwing property, smoothness, pencil hardness and impact resistance, and as to the composition stability were measured in the same manner as in Example 1.

The results are shown in Table 3.

COMPARATIVE EXAMPLE 2

The procedure of Comparative Example 1 was repeated except that the fluorine-containing copolymer obtained in Reference Example 2 was used instead of the copolymer in Reference Example 1.

The results are shown in Table 3.

TABLE 3

| Ex. No. | 1 | 2 | 3 | 4 | 5 | 6 |
|---|---|---|---|---|---|---|
| Flourine-containing copolymer | Copolymer in Ref. Ex. 7 | Copolymer in Ref. Ex. 8 | Copolymer in Ref. Ex. 9 | Copolymer in Ref. Ex. 10 | Copolymer in Ref. Ex. 11 | Copolymer in Ref. Ex. 12 |
| Property | | | | | | |
| Film thickness ($\mu$m) | 11 | 12 | 9 | 10 | 10 | 12 |
| Gloss (%) | 83 | 82 | 85 | 88 | 81 | 84 |
| Weatherability (%) | 80 | 78 | 75 | 76 | 78 | 75 |
| Adhesion | 100 | 100 | 100 | 100 | 100 | 100 |
| Boiling water resistance | No change | No change | No change | No change | No change | No change |
| Alkali resistance after boiling water resistance | No change | No change | No change | No change | No change | No change |
| Acid resistance | No change | No change | No change | No change | No change | No change |
| Appearance | Good | Good | Good | Good | Good | Good |
| Throwing property | Good | Good | Good | Good | Good | Good |
| Smoothness | Good | Good | Good | Good | Good | Good |
| Pencil hardness | 4H | 4H | 4H | 4H | 4H | 4H |
| Impact resistance | 50 cm | 50 cm | 50 cm | 50 cm | 50 cm | 50 cm |
| Stability of the composition | Good | Good | Good | Good | Good | Good |
| Fluorine ion content in the composition (ppm) | 0.87 | 1.21 | 1.45 | 1.62 | 1.79 | 1.85 |
| Chlorine ion content in the composition (ppm) | 3.24 | 3.35 | 6.79 | 4.93 | 5.63 | 7.13 |
| Total content of fluorine ion and chlorine ion in the composition (ppm) | 4.11 | 4.56 | 8.24 | 6.55 | 7.42 | 8.98 |

| Ex. No. | 7 | 8 | 9 | 10 | 11 |
|---|---|---|---|---|---|
| Flourine-containing copolymer | Copolymer in Ref. Ex. 13 | Copolymer in Ref. Ex. 14 | Copolymer in Ref. Ex. 15 | Copolymer in Ref. Ex. 16 | Copolymer in Ref. Ex. 17 |
| Property | | | | | |
| Film thickness ($\mu$m) | 11 | 9 | 10 | 12 | 11 |
| Gloss (%) | 80 | 90 | 80 | 85 | 86 |
| Weatherability (%) | 72 | 81 | 82 | 75 | 80 |
| Adhesion | 100 | 100 | 100 | 100 | 100 |
| Boiling water resistance | No change | No change | No change | No change | No change |
| Alkali resistance after boiling water resistance | No change | No change | No change | No change | No change |
| Acid resistance | No change | No change | No change | No change | No change |
| Appearance | Good | Good | Good | Good | Good |
| Throwing property | Good | Good | Good | Good | Good |
| Smoothness | Good | Good | Good | Good | Good |
| Pencil hardness | 4H | 4H | 4H | 4H | 4H |
| Impact resistance | 50 cm | 50 cm | 50 cm | 50 cm | 50 cm |
| Stability of the composition | Good | Good | Good | Good | Good |
| Fluorine ion content in the composition (ppm) | 2.66 | 1.62 | 1.91 | 1.04 | 1.91 |
| Chlorine ion content in the composition (ppm) | 4.12 | 3.65 | — | 5.28 | 3.13 |
| Total content of fluorine ion and chlorine ion in the composition (ppm) | 6.78 | 5.27 | 1.91 | 6.32 | 5.04 |

| Com. Ex. No. | 1 | 2 |
|---|---|---|
| Flourine-containing copolymer | Copolymer in Ref. Ex. 1 | Copolymer in Ref. Ex. 2 |
| Property | | |
| Film thickness ($\mu$m) | 10 | 11 |
| Gloss (%) | 84 | 81 |
| Weatherability (%) | 70 | 73 |
| Adhesion | 100 | 100 |

TABLE 3-continued

| | | |
|---|---|---|
| Boiling water resistance | No change | Partial whitening |
| Alkali resistance after boiling water resistance | Blisters were produced partially. | Blisters were produced. |
| Acid resistance | Blisters were produced partially. (after 7 days) | Blisters were produced wholly, (after 5 days) |
| Appearance | Good | Good |
| Throwing property | Good | Good |
| Smoothness | Good | Good |
| Pencil hardness | 4H | 4H |
| Impact resistance | 50 cm | 50 cm |
| Stability of the composition | Good | Deposition after one month |
| Fluorine ion content in the composition (ppm) | 17.0 | 26.7 |
| Chlorine ion content in the composition (ppm) | 20.4 | 41.3 |
| Total content of fluorine ion and chlorine ion in the composition (ppm) | 37.4 | 68.0 |

According to the electrodeposition coating composition of the present invention, bad influence on electrodeposition due to halogen ions, particularly fluorine ion can be extremely inhibited, thus the composition can give electrodeposited films having excellent properties.

In addition to the ingredients used in the Examples, other ingredients can be used in Examples as set forth in the specification to obtain substantially the same results.

What we claim is:

1. An electrodeposition coating composition comprising a fluorine-containing copolymer, a curing agent and an aqueous medium;

said composition having a fluorine ion content of not more than 15 ppm, and said fluorine-containing copolymer is a copolymer comprising 20 to 80% by mole of a fluoroolefin having the formula (I):

$$CX^1X^2=CF_2 \qquad (I)$$

wherein $X^1$ and $X^2$ are the same or different and each is a hydrogen, a fluorine, a chlorine or a trifluoromethyl group, and 2 to 60% by mole of a hydroxy vinyl ether having the formula (II):

$$CH_2=CH-O-R^1-OH \qquad (II)$$

wherein $R^1$ is a bivalent aliphatic group with 2 to 10 carbon atoms, and having carboxyl groups partially neutralized with a basic compound and having an acid value of 30 to 120.

2. The composition of claim 1, which has a fluorine ion content of not more than 10 ppm.

3. The composition of claim 1, wherein said fluorine-containing copolymer is a fluorine and chlorine containing copolymer and which has the total content of fluorine ion and chlorine ion of not more than 30 ppm.

4. The composition of claim 1, wherein said fluorine-containing copolymer has a fluorine ion content of not more than 150 ppm.

5. The composition of claim 1, wherein said fluorine-containing copolymer has a total content of fluorine ion and chlorine ion of not more than 300 ppm.

6. The composition of claim 1, wherein said fluorine-containing copolymer has an acid value of 30 to 120, and a hydroxyl value of 30 to 200, and is water-dispersible and electrophoric.

7. The composition of claim 1, wherein said fluorine-containing copolymer has an acid value of 40 to 120.

* * * * *

UNITED STATES PATENT AND TRADEMARK OFFICE
CERTIFICATE OF CORRECTION

PATENT NO. : 5,008,327

DATED : April 16, 1991

INVENTOR(S) : SHIRAI et al

It is certified that error appears in the above-identified patent and that said Letters Patent is hereby corrected as shown below:

On the cover page, item [75], "Masayuki Yamane", should read --Masayuki Yamana--.

Signed and Sealed this

Twenty-ninth Day of September, 1992

Attest:

DOUGLAS B. COMER

*Attesting Officer*  *Acting Commissioner of Patents and Trademarks*